United States Patent
Rajaiah et al.

(10) Patent No.: US 10,635,840 B2
(45) Date of Patent: Apr. 28, 2020

(54) BANNER NOTIFICATION IN LOCKED HOST MONITOR

(71) Applicant: AMERICAN MEGATRENDS INTERNATIONAL, LLC, Norcross, GA (US)

(72) Inventors: Arunprasad Rajaiah, Chennai (IN); Preethi Kalaiselvam, Chennai (IN); Ramachandran Arumugham, Chennai (IN); Vinothkumar Manickavelu, Chennai (IN)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 334 days.

(21) Appl. No.: 15/205,271

(22) Filed: Jul. 8, 2016

(65) Prior Publication Data

US 2018/0012042 A1    Jan. 11, 2018

(51) Int. Cl.
| | |
|---|---|
| H04L 29/06 | (2006.01) |
| G06F 21/84 | (2013.01) |
| G06F 21/62 | (2013.01) |
| G06F 3/14 | (2006.01) |
| G06F 21/31 | (2013.01) |

(52) U.S. Cl.
CPC ............ G06F 21/84 (2013.01); G06F 3/14 (2013.01); G06F 21/31 (2013.01); G06F 21/6218 (2013.01); *G06F 2221/032* (2013.01)

(58) Field of Classification Search
CPC ......... H04W 12/08; G06F 21/88; G06F 21/60
See application file for complete search history.

(56) References Cited

U.S. PATENT DOCUMENTS

| | | | |
|---|---|---|---|
| 2003/0126462 A1* | 7/2003 | Howard | H04W 12/0802 726/4 |
| 2007/0094426 A1* | 4/2007 | Chiang | G06F 3/023 710/73 |
| 2013/0208103 A1* | 8/2013 | Sands | G06F 21/31 348/78 |

(Continued)

OTHER PUBLICATIONS

Abrams, Lawrence. "How to lock your screen in Windows." Oct. 19, 2012. 7 pages. Accessed on Feb. 23, 2018.*

*Primary Examiner* — Jason K Gee
(74) *Attorney, Agent, or Firm* — Locke Lord LLP; Tim Tingkang Xia, Esq.

(57) ABSTRACT

Aspects of the disclosure relates to systems and methods for locking a display device of a host computer remotely using a management controller, and providing a banner notification on the locked display device. The system includes a computing device as the host computer, which has a display device, and a management controller. When the management controller receives a locking command, the management controller, in response to the locking command, performs the following operations: generating a locking instruction, and sending the locking instruction to the computing device to lock the display device; and generating a message display instruction including a message to be displayed, and sending the message display instruction to the display device of the computing device, in order to display the message on the display device. Thus, a local user at the computing device may be notified by the message that the display device is locked.

20 Claims, 3 Drawing Sheets

(56) References Cited

U.S. PATENT DOCUMENTS

2014/0096233 A1* 4/2014 Jaynes .................... G06F 21/31
  726/16
2016/0226873 A1* 8/2016 Liu ....................... H04W 48/17
2017/0325170 A1* 11/2017 Alshinnawi ....... H04W 52/0251

* cited by examiner

BANNER NOTIFICATION IN LOCKED HOST MONITOR

FIELD

The present disclosure relates generally to management controller technology, and more particularly to systems and methods for locking a display device of a host computer remotely using a management controller, and providing a banner notification on the locked display device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In a host computer having a management controller, the management controller may provide a feature of "host monitor lock," which is used to lock the local monitor (i.e., the display device of the host computer). However, a local user at the host computer may not know that the local monitor is locked, and may interfere the operation of the host computer accidently.

Therefore, an unaddressed need exists in the art to address the aforementioned deficiencies and inadequacies.

SUMMARY

Certain aspects of the present disclosure relate to a system including a computing device and a management controller communicatively connected to the computing device. In certain embodiments, the computing device includes a display device. The management controller comprising a processor and a non-volatile memory storing computer executable code, wherein the computer executable code, when executed at the processor of the management controller, is configured to: receive a locking command; and in response to receiving the locking command, generate a locking instruction, and send the locking instruction to the computing device to lock the display device of the computing device, and generate a message display instruction comprising a message to be displayed, and send the message display instruction to the locked display device of the computing device to display the message on the locked display device of the computing device.

In certain embodiments, the management controller is a baseboard management controller (BMC).

In certain embodiments, the locking command is received from a remote computing device communicatively connected to the management controller via a network. In certain embodiments, the remote computing device is configured to generate the locking command through a Java console.

In certain embodiments, the computer executable code includes a network control module, configured to receive the locking command from the remote computing device; a display lock module, configured to generate the locking instruction, and send the locking instruction to the computing device; and a message display module, configured to generate the message display instruction, and send the message display instruction to the locked display device of the computing device. In certain embodiments, the computer executable code further includes an input control module, configured to generate an input locking instruction, and send the input locking instruction to the computing device to lock at least one input devices of the computing device.

In certain embodiments, the at least one input device comprises a keyboard and a mouse.

In certain embodiments, the management controller further includes a video graphics array (VGA) adapter, and the message display module is configured to send the message display instruction to the VGA adapter, such that the VGA adapter controls locked display device of the computing device based on the message display instruction to display the message on the locked display device of the computing device.

In certain embodiments, the message to be displayed is a text, a banner, or a combination thereof.

Certain aspects of the present disclosure relate to a method of locking a display device of a computing device by a management controller. In certain embodiments, the method includes: receiving, by the management controller, a locking command, wherein the management controller is communicatively connected to the computing device; and in response to receiving the locking command, generating, by the management controller, a locking instruction, and sending the locking instruction to the computing device to lock the display device, and generating, by the management controller, a message display instruction comprising a message to be displayed, and sending the message display instruction to the locked display device of the computing device to display the message on the locked display device of the computing device.

In certain embodiments, the management controller is a baseboard management controller (BMC).

In certain embodiments, the locking command is received from a remote computing device communicatively connected to the management controller via a network. In certain embodiments, the remote computing device is configured to generate the locking command through a Java console.

In certain embodiments, the method further includes generating, by the management controller, an input locking instruction, and sending the input locking instruction to the computing device to lock at least one input devices of the computing device.

In certain embodiments, the at least one input device comprises a keyboard and a mouse.

In certain embodiments, the management controller further includes a video graphics array (VGA) adapter, and the message display module is configured to send the message display instruction to the VGA adapter, such that the VGA adapter controls locked display device of the computing device based on the message display instruction to display the message on the locked display device of the computing device.

In certain embodiments, the message to be displayed is a text, a banner, or a combination thereof.

Certain aspects of the present disclosure relate to a non-transitory computer readable medium storing computer executable code. In certain embodiments, the computer executable code, when executed at a processor of a management controller, is configured to: receive a locking command; and in response to receiving the locking command, generate a locking instruction, and send the locking instruction to a computing device communicatively connected to the management controller to lock a display device of the computing device, and generate a message display instruction comprising a message to be displayed, and send the message display instruction to the locked display device of the computing device to display the message on the locked display device of the computing device.

In certain embodiments, the computer executable code includes: a network control module, configured to receive the locking command from a remote computing device communicatively connected to the management controller via a network; a display lock module, configured to generate the locking instruction, and send the locking instruction to the computing device; and a message display module, configured to generate the message display instruction, and send the message display instruction to the locked display device of the computing device. In certain embodiments, the computer executable code further includes an input control module, configured to generate an input locking instruction, and send the input locking instruction to the computing device to lock at least one input devices of the computing device.

In certain embodiments, the management controller is a baseboard management controller (BMC).

In certain embodiments, the locking command is received from a remote computing device communicatively connected to the management controller via a network. In certain embodiments, the remote computing device is configured to generate the locking command through a Java console.

In certain embodiments, the at least one input device comprises a keyboard and a mouse.

In certain embodiments, the management controller further includes a video graphics array (VGA) adapter, and the message display module is configured to send the message display instruction to the VGA adapter, such that the VGA adapter controls locked display device of the computing device based on the message display instruction to display the message on the locked display device of the computing device.

In certain embodiments, the message to be displayed is a text, a banner, or a combination thereof.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings. These accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein.

DETAILED DESCRIPTION

Figure 1:
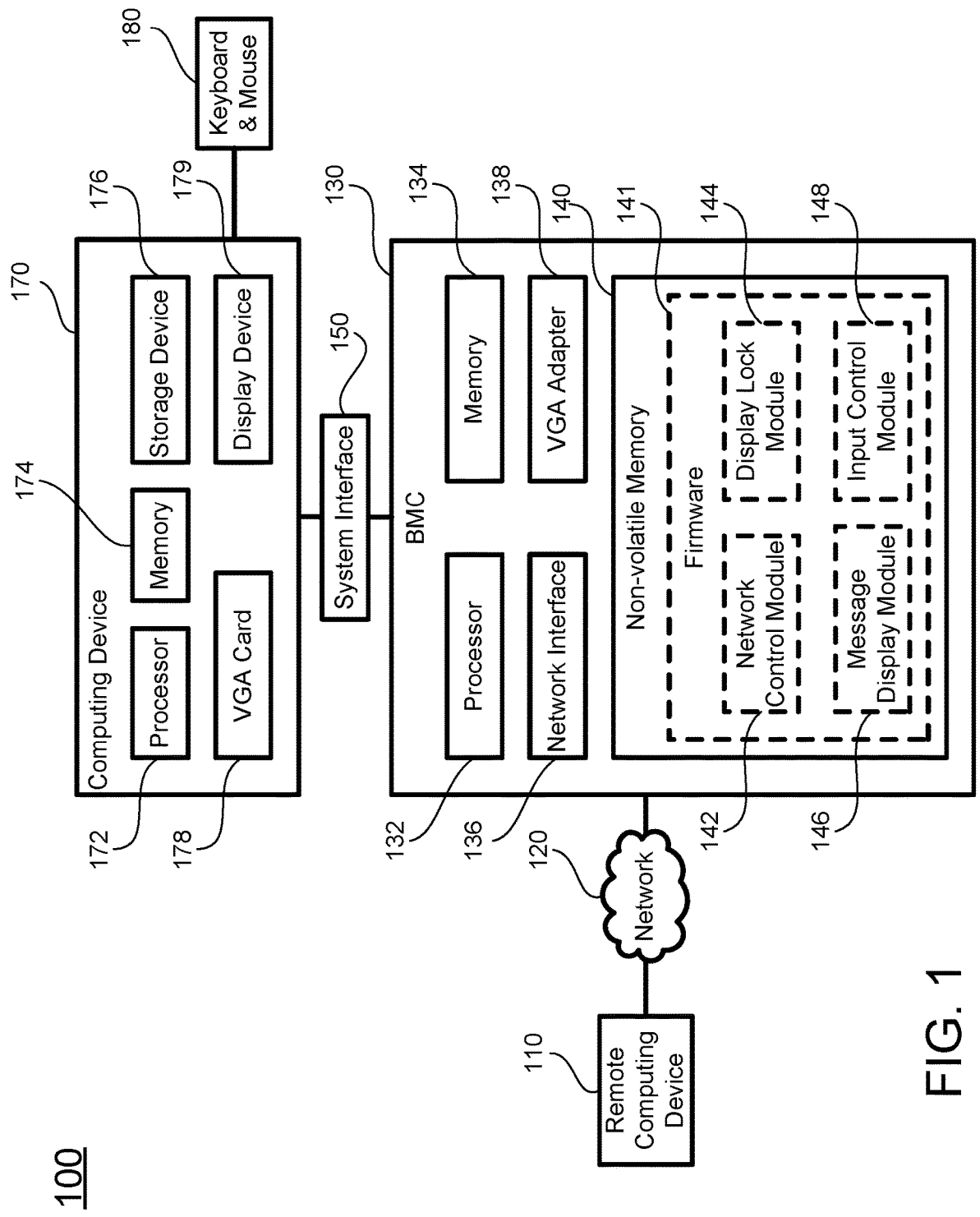
FIG. 1 schematically depicts an exemplary system according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refers to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

In one aspect, the present disclosure provides a baseboard management controller (BMC) that supports a feature of locking a display device of a host computing device, such as a local monitor. This locking feature may be performed from a remote Java console.

In certain embodiments, when the local display device of the host computing device is locked, and the keyboard and the mouse connected to the local computing device works, an administrator who goes and looks directly at the local display device finds the local display device as black screen may doubt some cable connection failure or machine issues. The administrator may then play with the keyboard, the mouse, or cable connections, which might lead to a chaos. In another example, when the user accessing the Java console is doing some operating system installation or any copying via redirection, if a user accessing the local display device presses Ctrl+Alt+Del using the keyboard, everything will get interrupted and fail. Therefore, in another aspect, the present disclosure further provides, when the local display device is locked by the remote user using the Java console, a system and a method for notifying a local user accessing the display device the locking status of the display device, and optionally locks the keyboard and the mouse to prevent interruption of the work of the remote user.

In accordance with the purposes of present disclosure, as embodied and broadly described herein, in certain aspects, the present disclosure relates to a system having a computing device and a baseboard management controller (BMC) communicatively connected to the computing device. FIG. 1 schematically depicts an exemplary system according to certain embodiments of the present disclosure. As shown in FIG. 1, a system 100 includes a remote computing device 110, a management controller 130, and a computing device 170. In certain embodiments, the management controller 130 is a BMC. The remote computing device 110 is communicatively connected to the BMC 130 via a network 110, and the BMC 130 is connected to the computing device 170 via a system interface 150.

In certain embodiments, the network 120 may be a wired or wireless network, and may be of various forms. Examples of the network 120 may include, but is not limited to, a local area network (LAN), a wide area network (WAN) including the Internet, or any other type of networks. The best-known computer network is the Internet.

The system interface 150 is an interface to perform data transfer between the computing device 170 and the BMC 130. In certain embodiments, the system interface 150 may be a typical standardized Intelligent Platform Management Interface (IPMI) system interfaces, such as a keyboard controller style (KCS) interface, a system management interface chip (SMIC) interface, or a block transfer (BT) interface. In certain embodiments, the BMC 130 may be connected to the computing device 170 via one or more interfaces replacing or in addition to the system interface 150. For example, the BMC 130 may be connected to the computing device 170 via a universal serial bus (USB) interface. In certain embodiments, data transfer between the BMC 130 and the computing device 170 may be in the format of IPMI messages, which goes through the system interface 150 or any other interfaces between the BMC 130 and the computing device 170.

The computing device 170 is a host computer of the BMC 130. I In certain embodiments, the computing device 170 may be a general purpose computer, a specialized computer, a server, or any other types of computing device. As shown in FIG. 1, the computing device 170 may include, without being limited to, a processor 172, a memory 174, a storage device 176, a video graphics array (VGA) card 178, a display device 179, and keyboard and mouse 180. In certain embodiments, the computing device 170 may include other hardware components and software components (not shown) to perform its corresponding tasks. Examples of these hardware and software components may include, but not limited to, other required memory, interfaces, buses, Input/Output (I/O) modules and peripheral devices.

The processor 172 is a host processor which is configured to control operation of the computing device 170. In certain embodiments, the processor 172 may be a central processing unit (CPU). The processor 172 may execute an operation system (OS) and/or other applications of the computing device 170. In some embodiments, the computing device 170 may have more than one CPU as the processor, such as two CPUs, four CPUs, eight CPUs, or any suitable number of CPUs.

The memory 174 may be a volatile memory, such as the random-access memory (RAM), for storing the data and information during the operation of the computing device 170. In certain embodiments, the computing device 170 may run on more than one memory 174. In certain embodiments, the memory 174 is in communication with the processor 172 through a system bus (not shown).

The storage device 176 is a data storage media for storing the OS (not shown) and other applications of the computing device 170. Examples of the storage device 176 may include non-volatile memory such as flash memory, memory cards, USB drives, hard drives, floppy disks, optical drives, or any other types of data storage devices. In certain embodiments, the computing device 170 may have multiple storage devices 176, which may be identical storage devices or different types of storage devices, and the applications of the computing device 170 may be stored in one or more of the storage devices 176 of the computing device 170.

The VGA card 178 is a display controller to control the display device 179. In certain embodiments, the VGA card 178 may be a 15-pin D-subminiature VGA connector, or any other type of display controllers or cards.

The display device 179 is an output device for displaying signals for the computing device 170. In certain embodiments, the display device 179 is configured to display signals generated by the VGA card 178. In certain embodiments, the display device 179 may be a peripheral device, such as a monitor of the computing device 170. Alternatively, the display device 179 may be an integral component of the computing device 170.

The keyboard and the mouse 180 are input devices of the computing device 170. In certain embodiments, the computing device 170 may include only one of the keyboard and/or the mouse as the input device. Alternatively, in certain embodiments, the computing device 170 may include other input devices, such as a touch pad, a touch panel, or any other input device that a local user may perform input to the computing device 170.

The BMC 130 is a specialized microcontroller that manages the interface between system management software and platform hardware. In certain embodiments, the BMC 130 may be a service processor (SP). Different types of sensors can be built into the computing device 170, and the BMC 130 reads these sensors to obtain parameters such as temperature, cooling fan speeds, power status, OS status, etc.

As shown in FIG. 1, the BMC 130 includes a processor 132, a memory 134, a network interface 136, a VGA adapter 138, and a non-volatile memory 140. In certain embodiments, the BMC 130 may include other components, such as at least one I/O device (not shown).

The processor 132 controls operation of the BMC 130. The processor 132 may execute a firmware 141 or other codes stored in the BMC 130. In certain embodiments, the BMC 130 may run on or more than one processor.

The memory 134 may be a volatile memory, such as the RAM, for storing the data and information during the operation of the BMC 130. When the BMC 130 restarts, the contents stored in the memory 134 will be lost.

The network interface 136 is the point of interconnection between the remote computing device 110 and the BMC 130. The network interface 136 may be a network interface card (NIC), but does not have to have a physical form. Instead, the network interface 136 can be implemented in software. The network interface 136 may be a system's (software and/or hardware) interface between two pieces of equipment or protocol layers in a computer network. The network interface 136 may have some form of network address. This may consist of a node Id and a port number or may be a unique node Id in its own right. The network interfaces 136 provides standardized functions such as passing messages, connecting and disconnecting, etc.

The VGA adapter 138 is a display controller provided by the BMC 130. In certain embodiments, the BMC 130 may control the VGA adapter 138 to display information on the display device 179 of the computing device 170. In certain embodiments, the VGA adapter 138 is configured to transmit the data to be displayed on the display device 179 directly to the display device 179, or transmit the data to be displayed to the VGA card 178 of the computing device 170. In certain embodiments, the VGA adapter 138 may be a hardware component, or may be a software implemented adapter.

As shown in FIG. 1, the non-volatile memory 140 stores the firmware 141 of the BMC 130. In certain embodiments, the non-volatile memory 140 may be a flash memory.

The firmware 141 of the BMC 130 includes computer executable codes for performing the operation of the BMC 130. In certain embodiments, the computer executable code or instructions may collectively form the firmware 141. As shown in FIG. 1, the firmware 141 includes, among other things, a network control module 142, a display lock module 144, a message display module 146, and an input control module 148. In certain embodiments, each of the modules of the firmware 141 may further include one or more sub-modules. Alternatively, in certain embodiments, some or all of the modules of the firmware 141 may collectively form a single module.

The network control module 142 controls communication between the remote computing device 110 and the BMC 130 via the network 120 and the network interface 136. In certain embodiments, the network control module 142 is configured to receive a locking command from the remote computing device 110, and in response to receiving the locking command, trigger the actions of the display lock module 144, the message display module 146, and the input control module 148.

The display lock module 144, when triggered by the locking command received by the network control module 142, is configured to generate a locking instruction, and send the locking instruction to the computing device 170 to lock the display device 190.

The message display module 146, when triggered by the locking command received by the network control module 142, is configured to generate a message display instruction, and send the message display instruction to the computing device 170. The message display instruction includes a message to be displayed. The display device 179 then displays the message. In certain embodiments, the message includes at least one of a text message or a banner, such as "Local monitor is locked by a Remote session user" or "Local monitor access privilege is DECLINED," which is used to notify a local user at the computing device 170 that the display device 179 is locked. The above described message may be uploaded into the BMC inbuilt VGA adaptor 138 in advance, and the message can then be transmitted to the display device 179 whenever the display device 190 is locked from a keyboard, video and mouse (KVM) session.

The BMC 130 optionally includes the input control module 148. The input control module 148, when triggered by the locking command received by the network control module 142, is configured to generate an input locking instruction, and send the input locking instruction to the computing device 170. The computing device 170, upon receiving the input locking instruction, locks certain inputs of the computing device 170, such as a keyboard or a mouse.

The number of the remote computing device 110 is one or more, and the one or more remote computing devices 110 are remotely connected to the BMC 130 via the network 120. In certain embodiments, the remote computing device 110 may be a general purpose computer, a specialized computer, a server, a mobile device such as a laptop computer, a smartphone or a tablet, a management controller, a system-on-chip (SOC), or any other types of computing device. In certain embodiments, the computing device 170 is a server, and the remote computing device includes one or more client computers. In certain embodiments, the remote computing device 110 provides interface for a Java console user.

Figure 2:
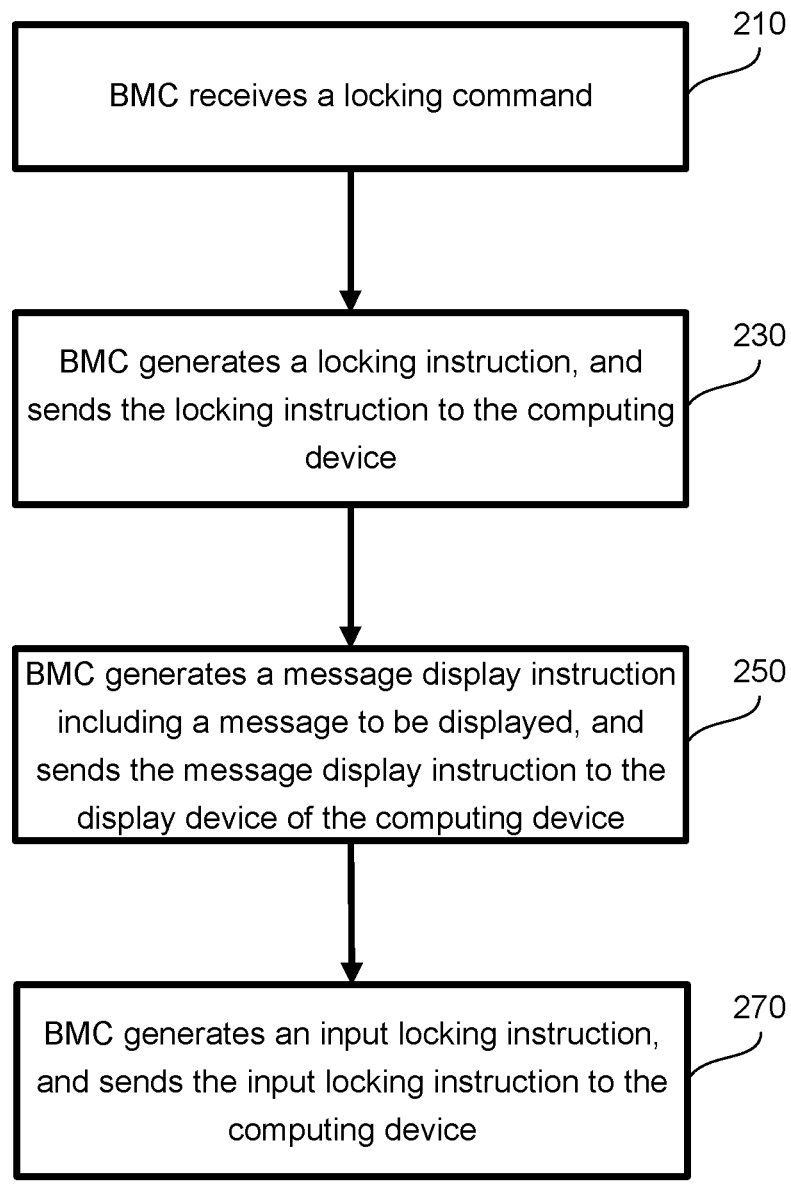
FIG. 2 schematically depicts a flowchart of a method of locking a display device according to certain embodiments of the present disclosure.

FIG. 2 schematically depicts a flowchart showing a method of locking a display device according to certain embodiments of the present disclosure. In certain embodiments, the method as shown in FIG. 2 may be implemented on a system as shown in FIG. 1. It should be particularly noted that, unless otherwise stated in the present disclosure, the steps of the method may be arranged in a different sequential order, and are thus not limited to the sequential order as shown in FIG. 2.

As shown in FIG. 2, at procedure 210, the BMC 130 receives a locking command from the remote computing device 110. In certain embodiments, the locking command may be entered by an administrator or a user on the remote computing device 110, where the administrator or the user has the authority to lock the display 179. In other embodiments, the locking command may be generated by an application being executed. The locking command may be received by the network interface 136 via the network interface 136, where the network interface 136 may be controlled by the network control module 142 and the network control module 142 receives the locking command using the network interface 136.

At procedure 230, in response to receiving the locking command, the BMC 130 generates a locking instruction, and sends the locking instruction to the computing device 170 to lock the display device 179 of the computing device 170. The generation of the locking instruction may be triggered by the network control module 142 when the network control module 142 receives the locking command, and the generation of the locking instruction may be performed by the display lock module 144. In certain embodiments, the locking instruction includes the identification information of the monitor 179 that is to be locked. In certain embodiments, to transmit the locking instruction from the BMC 130 to the computing device 170, the locking instruction may be included in an IPMI message, such that the BMC 130 may send the IPMI message to the computing device 170 in order to lock the display device 179 of the computing device 170 accordingly.

At procedure 250, in response to receiving the locking command, the BMC 130 generates a message display instruction, and sends the message display instruction to the display device 179 of the computing device 170. The generation of the message display instruction may be triggered by the network control module 142 when the network control module 142 receives the locking command, and the generation of the message display instruction may be performed by the message display module 146. In certain embodiments, the message display instruction includes a message to be displayed and the identification information of the display device 1790 that plays the message. In certain embodiments, the message display instruction is transmitted from the VGA adapter 138 of the BMC 130 directly to the display device 179, or via the VGA 178 of the computing device 170, or any other suitable ways. The VGA adapter 138 of the BMC 130 and the VGA 178 of the computing device 170 may be connected directly or communicatively connected via the system interface 150. Upon receiving the message display instruction, the display device 179 shows the message accordingly. The message displayed on the display device 190 may be a text, a banner or any other type of warning message, such as "Local monitor is locked by a Remote session user" and "Local monitor access privilege is DECLINED."

At procedure 270, in response to receiving the locking command, the BMC 130 generates an input locking instruction, and sends the input locking instruction to the computing device 170 to lock the keyboard and mouse 180. The generation of the input locking instruction may be triggered by the network control module 142 when the network control module 142 receives the locking command, and the generation of the input locking instruction may be performed by the input control module 148. In certain embodiments, the input locking instruction includes a message to lock input methods of the computing device 170. The input locking instruction may be generated as an IPMI message, and is transmitted from the BMC 130 to the computing device 170 via the system interface 150. Upon receiving the input locking instruction, the computing device 170 locks certain input methods of the computing device 170, such as a keyboard or a mouse.

As described above, the procedures 230, 250 and 270 may be performed in any order, for example, sequentially, or in parallel, or independent from each other. In certain embodiments, at least one of the procedures 250 and 270 is optional.

Figure 3:
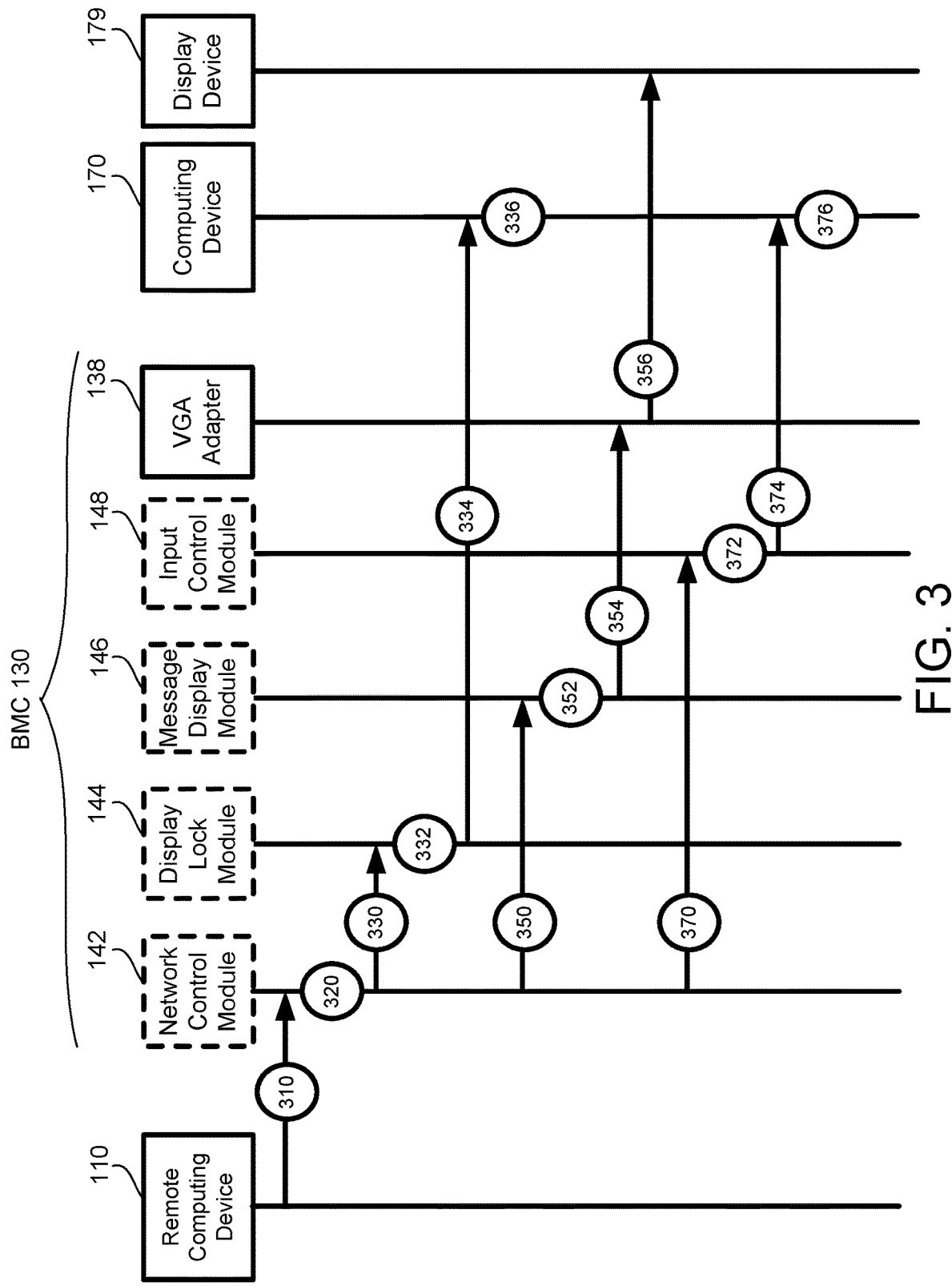
FIG. 3 schematically depicts a display locking process according to certain embodiments of the present disclosure.

FIG. 3 schematically depicts a display locking process according to certain embodiments of the present disclosure. In certain embodiments, the method as shown in FIG. 3 may be implemented on a system as shown in FIG. 1. It should be particularly noted that, unless otherwise stated in the present disclosure, the steps of the method may be arranged in a different sequential order, and are thus not limited to the sequential order as shown in FIG. 3.

As shown in FIG. 3, at procedure 310, the remote computing device 110 sends a locking command to the network control module 142 of the BMC 130 via the network 120 and the network interface 136. In certain embodiments, the locking command may be entered by an administrator or a user on the remote computing device 110, where the administrator or the user has the authority to lock the display 190. In other embodiments, the locking command may be generated by an application being executed.

Upon receiving the locking command from the remote computing device 110, at procedure 320, the network control module 142 processes the locking command, and triggers actions of the display lock module 144, the message display module 146, and the input control module 148. The trigger action may be performed by generates and sends trigger messages to those modules 14, 146 and 148 respectively at procedures 330, 350 and 370, where each of the trigger messages includes function to call one of the modules 144, 146 and 148 to perform an action.

At procedure 332, after the display lock module 144 receives the corresponding trigger message, the display lock module 144 generate a locking instruction. Then at procedure 334, the display lock module 144 sends the generated locking instruction to the computing device 170, to lock the display device 179 at procedure 336.

At procedure 352, after the message display module 146 receives and processes the corresponding trigger message, the message display module 146 generate a message display instruction. The message display instruction includes a message to be displayed. The message to be displayed may be any form of a message, such as a text, a banner, or a warning message. In certain embodiments, the message may be "Local monitor is locked by a Remote session user" or "Local monitor access privilege is DECLINED." Then at procedure 354, the message display module 146 sends the generated message display instruction to the VGA adapter 138 of the BMC 130. At procedure 356, according to the message display instruction, the VGA adapter 138 sends the message to the display device 179 and display the message on the display device 179.

At procedure 372, after the input control module 148 receives and processes the corresponding trigger message, the input control module 148 generate an input locking instruction. Then at procedure 374, the input control module 148 sends the generated input locking instruction to the computing device 170, for example, via the system interface 150. The input locking instruction may be in a form of an IPMI message or may be attached to an IPMI message. At procedure 376, the computing device 170 processes the received input locking instruction, and according to the input locking instruction, locks input of the computing device 170. For example, the inputs that are locked includes a keyboard and a mouse.

In certain embodiments, when the display device 190 and/or the keyboard and mouse of the computing device 170 are locked, and a local user interrupt the keyboard, the system is further configured to send an alert request to the remote user who uses the remote computing device to lock the display device 179. In response to receiving the alert message, the remote user can either release the host lock by saying YES or reject the access by saying NO. In certain embodiments, default access to the display device by the local user will be provided after a timeout period, such as 30 seconds, if there is no acknowledgement from the remote Java console user. In certain embodiments, another banner can be uploaded to the VGA 138 of the BMC 130 to show the message such as "Local monitor access privilege is DECLINED" when the display device 190 user access request is rejected.

In another aspect, the present disclosure relates to a non-transitory computer readable medium storing computer executable code. In certain embodiments, the computer executable code may be the firmware stored in the non-volatile memory 140 as described above. The computer executable code, when being executed, may perform one of the methods described above. In certain embodiments, the non-transitory computer readable medium may include, but not limited to, the non-volatile memory 140 of the BMC 130 as described above, or any other storage media of the BMC 130.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a computing device having a display device, at least one input device and a video graphics array (VGA) card configured to control the display device;
a management controller communicatively connected to the computing device and operable independent and separately from the computing device, the management controller comprising a processor, a VGA adapter configured to control the display device of the computing device, and a non-volatile memory storing computer executable code; and
a remote computing device communicatively connected to the management controller via a network;
wherein the computer executable code, when executed at the processor of the management controller, is configured to:
receive a locking command from the remote computing device;
in response to receiving the locking command,
generate an intelligent platform management interface (IPMI) message including a locking instruction, and send the IPMI message including the locking instruction to the computing device to lock the display device of the computing device; and
generate a message display instruction comprising a message to be displayed, and send the message display instruction to the locked display device of the computing device through the VGA adapter to display the message on the locked display device of the computing device;
when the display device of the computing device is locked, receive an interrupt notification from the computing device indicating an access interrupt is received through the at least one input device of the computing device; and
in response to receiving the interrupt notification, generate an alert request indicating the access interrupt, and send the alert request to the remote computing device via the network, wherein the remote computing device, in response to the alert request, is configured to generate a response to the alert request to either unlock the display device of the computing device or to deny access of the computing device.

2. The system of claim 1, wherein the management controller is a baseboard management controller (BMC).

3. The system of claim 1, wherein the remote computing device is configured to generate the locking command through a Java console.

4. The system of claim 1, wherein the computer executable code comprises:
- a network control module, configured to receive the locking command from the remote computing device;
- a display lock module, configured to generate the locking instruction and the IPMI message, and send the IPMI message including the locking instruction to the computing device; and
- a message display module, configured to generate the message display instruction, and send the message display instruction to the locked display device of the computing device.

5. The system of claim 4, wherein the computer executable code further comprises:
- an input control module, configured to generate an input locking instruction, and send the input locking instruction to the computing device to lock the at least one input devices of the computing device.

6. The system of claim 1, wherein the at least one input device comprises a keyboard and a mouse.

7. The system of claim 4, wherein the message display module is configured to send the message display instruction to the VGA adapter, such that the VGA adapter controls the locked display device of the computing device based on the message display instruction to display the message on the locked display device of the computing device.

8. The system of claim 1, wherein the message to be displayed is a text message, a banner, or a combination thereof.

9. The system of claim 1, wherein the computer executable code, when executed at the processor of the management controller, is further configured to:
- after sending the alert request to the remote computing device via the network, and in response to not receiving a response to the alert request from the remote computing device within a timeout period, control the computing device to unlock the display device of the computing device.

10. A method for locking a display device of a computing device by a management controller, comprising:
- receiving, by the management controller, a locking command from a remote computing device communicatively connected to the management controller via a network, wherein the management controller is communicatively connected to the computing device and operable independent and separately from the computing device, the computing device comprises at least one input device and a video graphics array (VGA) card configured to control the display device, and the management controller comprises a VGA adapter configured to control the display device of the computing device;
- in response to receiving the locking command,
  - generating, by the management controller, an intelligent platform management interface (IPMI) message including a locking instruction, and sending the IPMI message including the locking instruction to the computing device to lock the display device; and
  - generating, by the management controller, a message display instruction comprising a message to be displayed, and sending the message display instruction to the locked display device of the computing device through the VGA adapter to display the message on the locked display device of the computing device;
- when the display device of the computing device is locked, receiving, by the management controller, an interrupt notification from the computing device indicating an access interrupt is received through at least one input device of the computing device; and
- in response to receiving the interrupt notification, generating, by the management controller, an alert request indicating the access interrupt, and sending the alert request to the remote computing device via the network, wherein the remote computing device, in response to the alert request, is configured to generate a response to the alert request to either unlock the display device of the computing device or to deny access of the computing device.

11. The method of claim 10, wherein the management controller is a baseboard management controller (BMC).

12. The method of claim 10, wherein the remote computing device is configured to generate the locking command through a Java console.

13. The method of claim 10, further comprising:
- generating, by the management controller, an input locking instruction, and sending the input locking instruction to the computing device to lock the at least one input devices of the computing device.

14. The method of claim 10, wherein the at least one input device comprises a keyboard and a mouse.

15. The method of claim 10, wherein the message display instruction is sent to the VGA adapter, such that the VGA adapter controls the locked display device of the computing device based on the message display instruction to display the message on the locked display device of the computing device.

16. A non-transitory computer readable medium storing computer executable code, wherein the computer executable code, when executed at a processor of a management controller, is configured to:
- receive a locking command from a remote computing device communicatively connected to the management controller via a network;
- in response to receiving the locking command,
  - generate an intelligent platform management interface (IPMI) message including a locking instruction, and send the IPMI message including the locking instruction to a computing device communicatively connected to the management controller to lock a display device of the computing device, wherein the management controller is operable independent and separately from the computing device, the computing device comprises at least one input device and a video graphics array (VGA) card configured to control the display device, and the management controller comprises a VGA adapter configured to control the display device of the computing device; and
  - generate a message display instruction comprising a message to be displayed, and send the message display instruction to the locked display device of the computing device through the VGA adapter to display the message on the locked display device of the computing device;
- when the display device of the computing device is locked, receive an interrupt notification from the computing device indicating an access interrupt is received through the at least one input device of the computing device; and
- in response to receiving the interrupt notification, generate an alert request indicating the access interrupt, and send the alert request to the remote computing device via the network, wherein the remote computing device, in response to the alert request, is configured to generate a response to the alert request to either unlock the display device of the computing device or to deny access of the computing device.

17. The non-transitory computer readable medium of claim 16, wherein the computer executable code comprises:
   a network control module, configured to receive the locking command from a remote computing device communicatively connected to the management controller via a network;
   a display lock module, configured to generate the locking instruction and the IPMI message, and send the IPMI message including the locking instruction to the computing device; and
   a message display module, configured to generate the message display instruction, and send the message display instruction to the locked display device of the computing device.

18. The non-transitory computer readable medium of claim 17, wherein the computer executable code further comprises:
   an input control module, configured to generate an input locking instruction, and send the input locking instruction to the computing device to lock the at least one input devices of the computing device.

19. The non-transitory computer readable medium of claim 16, wherein the at least one input device comprises a keyboard and a mouse.

20. The non-transitory computer readable medium of claim 17, wherein the message display module is configured to send the message display instruction to the VGA adapter, such that the VGA adapter controls the locked display device of the computing device based on the message display instruction to display the message on the locked display device of the computing device.

* * * * *